Dec. 22, 1970  E. R. DUNN  3,548,549
COOLANT CONTROL FOR DISC GRINDERS
Filed July 18, 1968  2 Sheets-Sheet 1
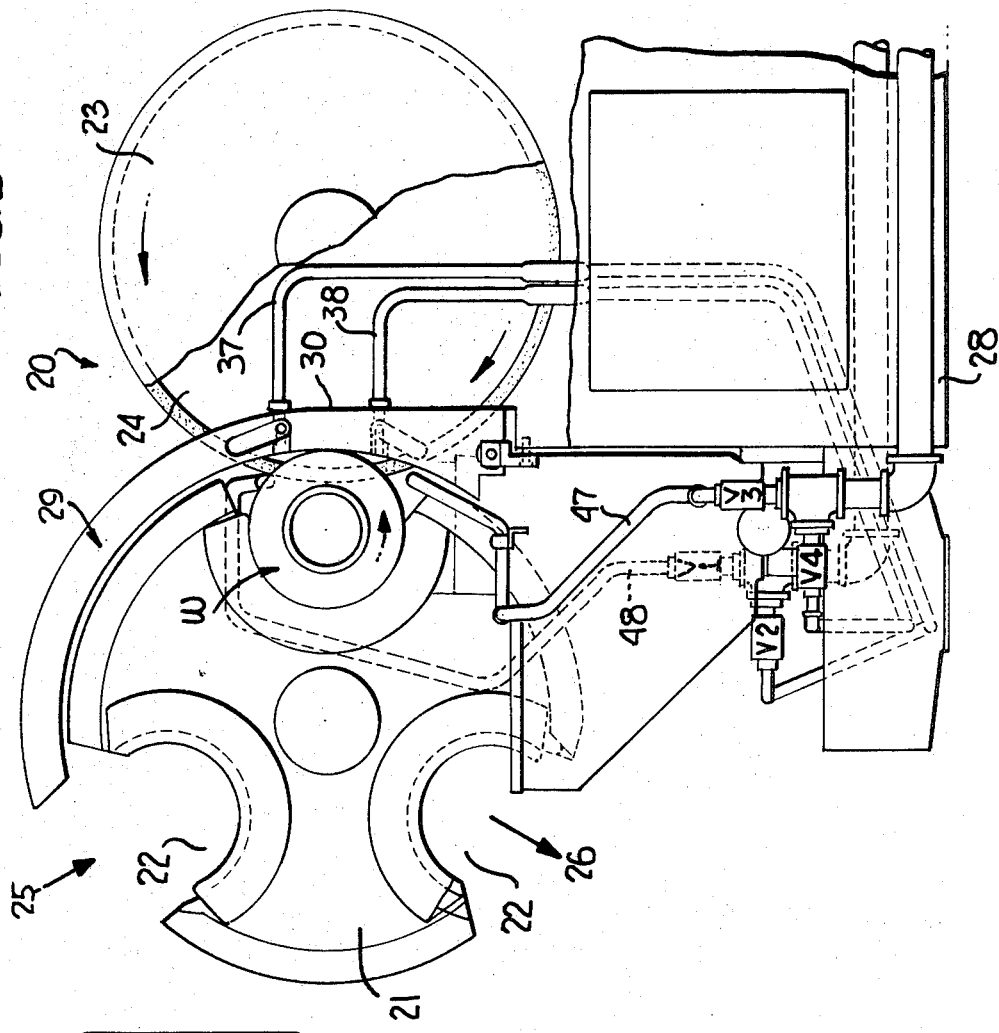
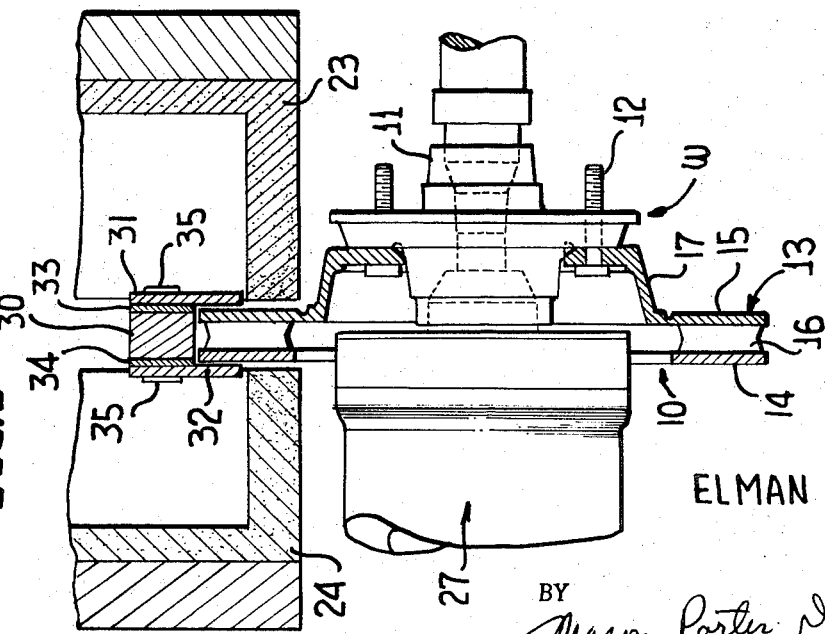
INVENTOR
ELMAN R. DUNN
BY
Mason, Porter, Diller & Brown
ATTORNEYS

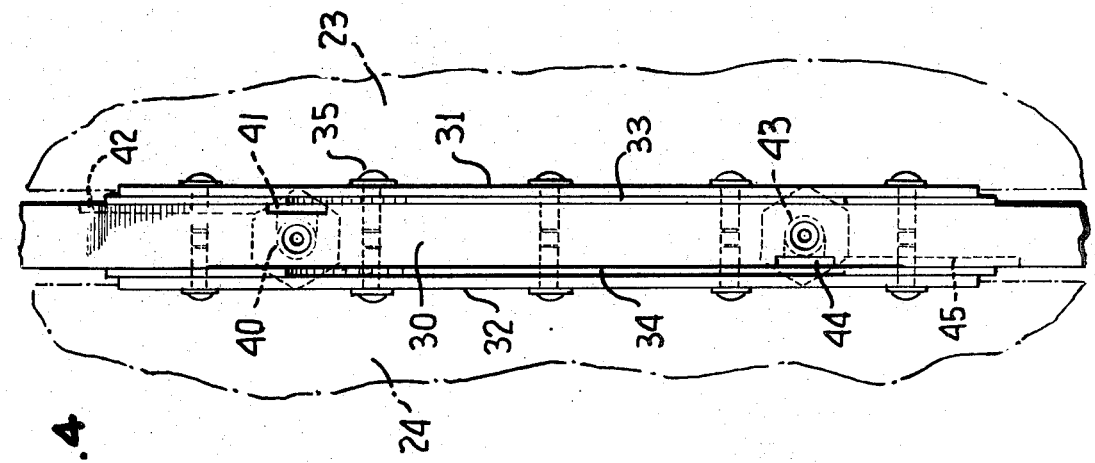
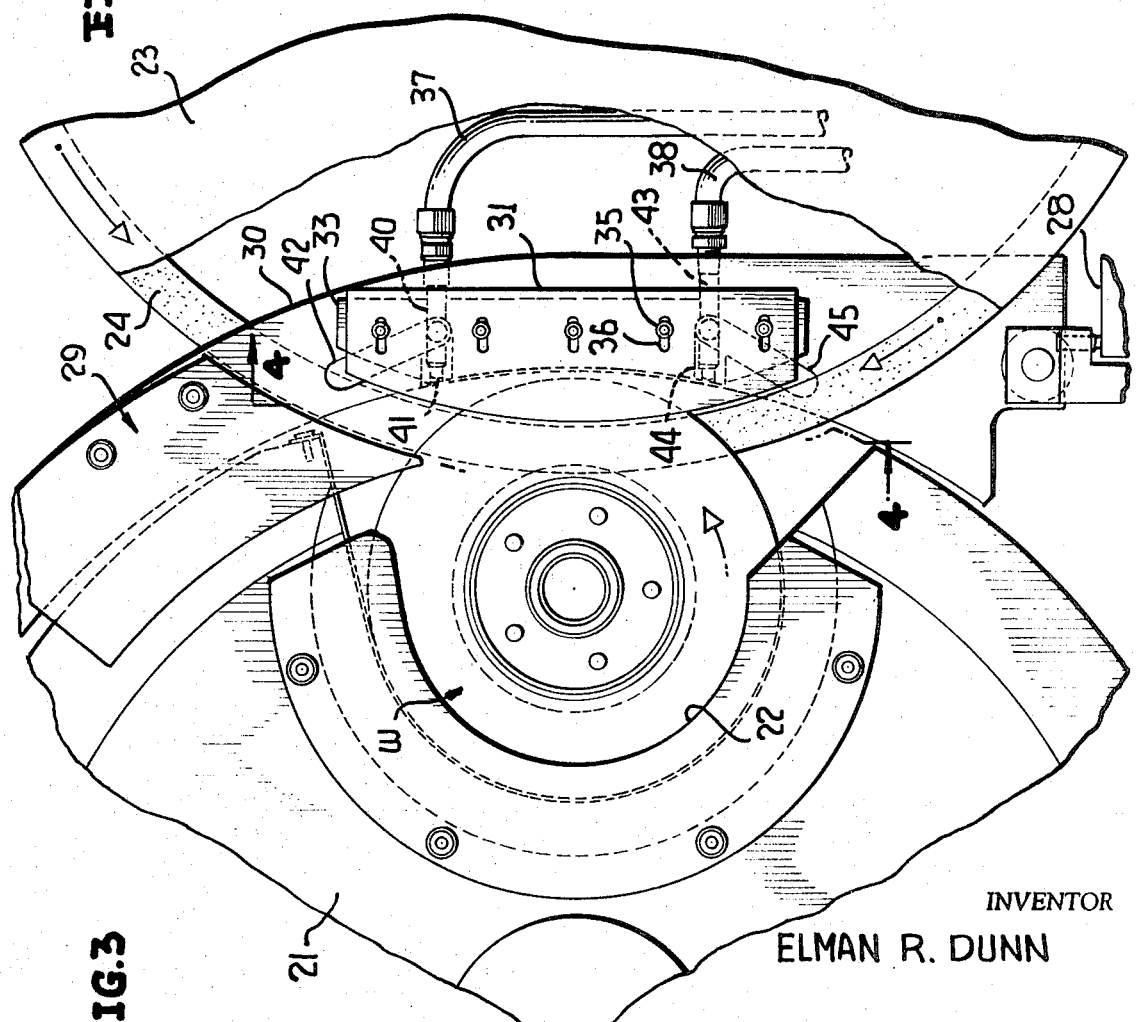
INVENTOR
ELMAN R. DUNN
BY Mason, Porter, Diller & Brown
ATTORNEYS United States Patent Office 3,548,549
Patented Dec. 22, 1970

3,548,549
COOLANT CONTROL FOR DISC GRINDERS
Elman R. Dunn, Roscoe, Ill., assignor to Litton Industries,
Inc., Waynesboro, Pa., a corporation of Delaware
Filed July 18, 1968, Ser. No. 745,872
Int. Cl. B24b 5/00, 55/02, 1/00
U.S. Cl. 51—118                                    12 Claims

ABSTRACT OF THE DISCLOSURE

This disclosure relates to a double disc grinder which is particularly adapted for grinding opposite surfaces of an automotive type brake disc. The particular problem involved is that the two surfaces being simultaneously ground are subject to differential restraints whereby there is a tendency for the brake disc, when heated during the grinding, to distort and thus when the surfaces cool, the surfaces will not be parallel to one another. Accordingly, the disc grinder is provided with a special coolant supply arrangement which differentially applies coolant to the two surfaces being ground so as to compensate for the differential in restraint and thus assure parallel ground surfaces.

---

This invention relates in general to double disc grinders, and more particularly to a double disc grinder which is particularly adapted for grinding workpieces wherein the opposite surface portions of the workpieces being ground are subject to differential restraints and therefore, differential expansion during the grinding operation.

This invention particularly relates to a disc grinder for grinding automotive type brake discs, but is not so limited. A typical automotive brake disc consists of a ring-like portion having opposed annular surfaces, both of which are ground at the same time by opposed abrasive discs of the disc grinder. One side of the ring-like member is connected by means of a web or spokes to a hub at the time of the grinding operation so as to make certain that the ground surfaces lie in planes perpendicular to the axis of rotation of the hub. While the one side of the ring-like member is connected to a hub member, the other side of the ring-like member is radially free, and hence freer to expand when heated.

During a grinding operation, it may be assumed that the same amount of heat is generated on both sides of the ring-like member. However, the side attached directly to the hub is restrained from radial expansion by the connecting web or spokes. The other side is not subjected to such restraint. Therefore, when usual equal coolant practices are employed, there is a tendency during grinding for the opposite portion of the ring-like member to expand at a faster rate than the hub side portion, causing the annular surfaces to curl towards the hub end of the brake disc while being ground squarely with respect to the axis of rotation while in a heated state. The ultimate result of this condition is that the finished ground surfaces do not remain square with the workpiece axis when workpiece temperatures return to ambient.

It is, therefore, a primary object of this invention to provide means for maintaining face squareness with respect to rotational axis and parallelism between opposed faces of a ring-like member during a disc grinding operation.

Another object is to provide a method of applying coolant to opposite surfaces of a ring-like workpiece in order to maintain side squareness with respect to rotational axis and parallelism between said sides during a grinding operation.

Another object of this invention is to provide a method of enforcing uniform radial expansion of a workpiece during a disc grinding operation on opposite sides of the workpiece.

A further object of this invention is to provide means for supplying different volumes of coolant to opposite sides of a workpiece during a grinding operation on the workpiece.

With the above and other objects in view that will hereinafter appear, the nature of the invention will be more clearly understood by reference to the following detailed description, the appended claims and the several views illustrated in the accompanying drawings:

In the drawings:

FIG. 1 is a schematic plan view, with parts shown in section, of a brake disc mounted for grinding and positioned relative to a pair of opposed grinding discs.

FIG. 2 is a diagrammatic end elevational view of a portion of a disc grinder formed in accordance with this invention and schematically shows the manner in which a workpiece is positioned relative to the abrasive discs and the manner in which coolant is supplied to both the abrasive discs and the workpiece.

FIG. 3 is an enlarged fragmentary elevational view showing more particularly the mounting of the workpiece relative to the abrasive discs and coolant supply means.

FIG. 4 is an enlarged fragmentary vertical sectional view taken along the line 4—4 of FIG. 3 and shows more specifically the details of the means for distributing coolant.

Referring now to the drawings in detail, it will be seen that there is illustrated in FIG. 1 a brake disc which is to be ground in accordance with this invention, the brake disc being generally identified by the numeral 10. The brake disc 10 is illustrated as being mounted on a hub member 11 by means of lug bolts 12 which are utilized for the securement of a wheel to the hub member 11.

The brake disc 10 is of a typical construction and includes a ring-like member, which is generally referred to by the numeral 13. The ring-like member 13, although it may be of a solid construction, is preferably constructed of two annular members 14 and 15 which are connected together at circumferentially spaced intervals by a web 16.

The ring-like member 13 is spaced radially outwardly of the hub 11 and is connected thereto by means of a web 17. It is to be noted that the web 17 is integrally connected to the annular member 15. As a result of the direct connection of the annular member 15 to the hub member 11 while the annular member 14 is free of restraint except its connection to the annular member 15, it will be readily apparent that when the remote surfaces of the annular members 14 and 15 are ground and conventionally heated to the same temperature, there will be a resultant warping or curving of the ring-like member 13. It will be readily apparent that if the ring-like member 13 is so distorted at the time the surfaces thereof are being ground, when the brake disc 10 returns to ambient temperatures, the ground surfaces will no longer be normal to the axis of rotation of the hub member 11.

At this time, it is pointed out that in lieu of the annular member 15 being connected to the hub member 11 by means of a solid web 17, in some constructions, spokes may be provided. Also, in lieu of the ring-like member 13 being in the form of two annular members connected by the webs 16, the ring-like member 13 could be of a solid construction. These factors merely vary the degree of restraint at the two sides of the ring-like member 13 and are within the realm of this invention. It is also to be understood that this invention is not restricted to a grinding machine which is limited to the grinding of automotive type brake discs, but may be utilized in the grinding of all types of workpieces having differential restraint causing unequal distortion of a workpiece during the grinding operation.

Referring now to FIG. 2 in particular, it will be seen that there are illustrated components of a disc grinder formed in accordance with this invention, the disc grinder being generally referred to by the numeral 20. Only those components of the disc grinder 20 which particularly relate to this invention are specifically illustrated and will be specifically described here.

The disc grinder 20 includes a rotary indexing dial or carrier 21 having recessed portions or pockets 22 for receiving workpieces which are carried into grinding relation between a right hand abrasive disc 23 and a left hand abrasive disc 24. The abrasive discs 23 and 24 are of a cup-shaped configuration, as is best shown in FIG. 1, and the abrasive disc 23 is rotated downwardly in a counterclockwise direction while the abrasive disc 24 is rotated upwardly in a clockwise direction as is clearly shown in FIG. 2.

At this time it is pointed out that the entire brake disc and hub member assembly will be referred to as a workpiece and identified by the letter W. The workpieces W will be delivered to the dial 21 generally along the path of the arrow 25 and will be discharged from the dial 21 generally along the path of the arrow 26. Inasmuch as feeding and discharge mechanisms are not a part of this invention, they will be neither specifically illustrated nor described.

When a workpiece is indexed by the indexing of the dial or carrier 21 to be positioned between the abrasive discs 23 and 24, the hub member 11 will be engaged and supported for rotation in centered relation with respect to a predetermined axis by means of a suitable clamp type support assembly, which is generally identified by the numeral 27, as is shown in FIG. 1. The workpiece W is then mounted for rotation about a predetermined axis and is now ready to have the remote surfaces of the ring-like member 13 ground both parallel to one another and normal to the axis of rotation.

At this time it is pointed out that the disc grinder 20 includes a bed 28 which has fixedly mounted thereon a guide, generally identified by the numeral 29 which is particularly designed for cooperation with the dial and an associated workpiece W for preventing outward radial movement of the workpiece as it approaches grinding position.

Referring now to FIGS. 3 and 4 in particular, it will be seen that the guide 29 includes a guide member 30 which also serves as a means for distributing coolant to the workpiece W and the abrasive discs 23 and 24. The guide member 30 passes between the abrasive discs 23 and 24 and, as is best illustrated in FIG. 1, has a thickness less than the thickness of the ring-like member 13 when ground to size. Generally within the confines of the abrasive discs 23 and 24 there is secured to opposite sides of the guide member 30 baffle members 31 and 32 which are spaced from the guide member 30 by means of spacers 33 and 34, respectively. It will be seen that the baffle members and the spacers are secured in place by means of suitable fasteners 35 which are threaded into the guide member 30. In addition, as is clearly shown in FIG. 3, the baffle members 31 and 32 are slotted as at 36 to receive the fasteners 35 whereby adjustment of the baffle members 31 and 32 relative to the guide member 30 may be effected.

Referring now to FIGS. 1 and 3 in particular, it will be seen that the baffle members 31 and 32 are spaced apart a distance greater than the initial thickness of the ring like member 13 and thus must fit within the confines of the abrasive discs 23 and 24.

The portion of the guide member 30 which is utilized to supply coolant has connected thereto coolant lines 37 and 38. As is clearly shown in FIGS. 2 and 3, the coolant line 37 is connected to the guide member 30 above a horizontal plane through the axis of the abrasive discs whereas the coolant line 38 is connected to the guide member 30 below the horizontal plane.

The coolant line 37 is connected to a passager 40 in the guide member 30. The passage 40 has an outlet 41 which directs coolant to the right hand surface of the workpiece W, which in the case of the brake disc 13 would be the surface of the annular member 15. The passage 40 is also connected to a recess 42 in the guide member 30, which recess 42 is partially enclosed by the spacer 33 and the baffle member 31. Coolant passes from the passage 40 up through the recess 42 against the operative surface of the downwardly moving right hand abrasive disc 23 before its engagement with the workpiece W.

Coolant from the coolant line 38 enters into the guide member 30 into a passage 43 formed therein. The passage 43 has an outlet 44 which directs coolant to the left hand surface of the workpiece, which in the case of the brake disc 10 is the surface of the annular member 14. The guide member 30 also has formed therein a recess 45 which receives coolant from the passage 43 and directs coolant against the face of the upwardly moving left-hand abrasive disc 24 before its engagement with the workpiece W. The recess 45 is partially enclosed by the spacer 34 and the baffle member 32.

Referring now to FIG. 2 in particular, it will be seen that in addition to the coolant supplied through the guide member 30 by the coolant lines 37 and 38, the disc grinder also includes coolant lines 47 and 48. The coolant line 47 directs coolant under the workpiece W to the face of the left hand abrasive 24 near the point where the surfaces of the workpiece enter the grinding zone between the abrasive discs.

The coolant line 48 directs coolant onto the left hand surface of the workpiece W near the point where the work surface thereof emerges from the grinding zone to provide an after cooling effect. The flow of coolant through the coolant lines 37, 38, 47, and 48 is controlled by control valves V2, V4, V3 and V1, respectively. These control valves are individually adjustable to provide for the desired flow of coolant through the respective coolant lines.

It will be readily apparent that the three coolant lines 38, 47 and 48 direct coolant on the left hand abrasive 24 or the left hand side of the workpiece W to provide rapid dissipation of heat from that side of the workpiece to keep radial thermal expansion of that part of the workpiece to a minimum. In the case of the brake disc 10, this would be the annular member 14. On the other hand, the single coolant line 37 directs coolant to the right hand abrasive 23 and also to the right hand side of the workpiece W. In this case, heat dissipation is effected at a slower rate and the resultant radial thermal expansion of this portion of the workpiece W, the annular member 15 in the case of the brake disc 10, is such to overcome the restraint on the ring-like member 13 by the web 17 which connects the ring-like member 13 to the hub 11, in order to equal the radial thermal expansion of the left hand side of the workpiece.

It is to be understood that the valves V1, V2, V3 and V4 will be adjusted as required to provide a balance of heat dissipation from the workpiece W which will provide uniform radial thermal expansion of both sides of the workpiece. Although the adjustment of the valves will primarily be to take care of unequal restraint of opposite surfaces of the workpiece, the coolant control may also be utilized to compensate for the removal of unequal amounts of stock from opposite sides of a workpiece, which unequal stock removal would normally result in a differential heating of the workpiece and effect warping or distortion thereof during a grinding operation.

Although this invention has been specifically illustrated and described only with respect to a particular workpiece and with respect to a disc grinder, it is to be understood that the principles of the invention may be utilized equally as well in conjunction with other machine tools and other workpieces and minor changes may be made therein without departing from the spirit of the invention.

I claim:

1. An apparatus for simultaneously machining opposite surfaces of a workpiece wherein said surfaces are subject to a rise in temperature during the machining thereof and said surfaces are subjected to different degrees of expansion when heated during machining and whereby said surfaces normally would move out of their intended planes, said apparatus comprising
   (a) a pair of opposed separately acting machining elements for simultaneously engaging opposite surfaces of a workpiece,
   (b) a support for positioning a workpiece between said machining elements for engagement thereby, and
   (c) coolant supply means for differentially supplying coolant to said surfaces in proportion to the tendency of said surfaces to be heat affected to prevent relative movement of said surfaces.

2. The apparatus of claim 1 wherein said coolant means functions in a manner whereby certain of said coolant is applied to said machining elements and other of said coolant is applied directly to said workpiece.

3. The apparatus of claim 1 wherein said coolant supply means includes
   (a) first means for directing coolant against said surfaces and said machining elements generally in the areas of contact therebetween, and
   (b) second means for directing additional coolant to that one of said surfaces which is the most affected by temperature rise.

4. The apparatus of claim 1 wherein said coolant supply means includes
   (a) first means for directing coolant against said surfaces and said machining elements generally in the areas of contact therebetween, and
   (b) second means for directing additional coolant to that one of said surfaces which is the most affected by temperature rise, and to the one of said machining elements engaged with said one surface.

5. The apparatus of claim 1 wherein said coolant supply means includes
   (a) first means for directing coolant against said surfaces and said machining elements generally in the areas of contact therebetween, and
   (b) second means for directing additional coolant to that one of said surfaces which is the most affected by temperature rise,
   (c) said second means being positioned to direct said additional coolant to portions of said one surface immediately after a machining operation thereon.

6. The apparatus of claim 1 wherein said coolant supply means includes
   (a) first means for directing coolant against said surfaces and said machining elements generally in the areas of contact therebetween, and
   (b) second means for directing additional coolant to that one of said surfaces which is the most affected by temperature rise, and to the one of said machining elements engaged with said one surface,
   (c) said second means being positioned to direct said additional coolant onto said one machining element immediately prior to engagement with said workpiece.

7. The apparatus of claim 1 wherein
   (a) said apparatus is a grinding machine, and
   (b) said machining elements are grinding discs.

8. The apparatus of claim 1 wherein
   (a) said apparatus is a grinding machine, and
   (b) said machining elements are cup-shaped grinding discs disposed in opposed relation, and
   (c) said coolant supply means includes a fixture for directing coolant to said grinding wheels and said surfaces,
   (d) said fixture being positioned between and partially within the confines of said grinding discs.

9. The apparatus of claim 8 wherein said apparatus includes
   (a) an indexing dial for sequentially positioning workpieces between said grinding discs, said indexing dial having workpiece receiving recesses, and
   (b) a guide cooperating with said rotary carrier to retain workpieces in said recesses,
   (c) said fixture being part of said guide.

10. The apparatus of claim 8 wherein said apparatus includes
    (a) an indexing dial for sequentially positioning workpieces between said grinding discs, said indexing dial having workpiece receiving recesses, and
    (b) a guide cooperating with said rotary carrier to retain workpieces in said recesses,
    (c) said fixture being part of said guide and including
    (d) a central guide forming portion having a concave surface facing said indexing dial and forming a continuation of a guiding surface of said guide, and
    (e) outer coolant deflecting portions each having a convex surface facing said indexing dial with said convex surface generally conforming to the curvature of an adjacent surface of a respective grinding disc.

11. A method of simultaneously grinding opposite surfaces of a workpiece to lie in predetermined planes wherein the surfaces are on portions of the workpiece subjected to different degrees of expansion due to heating when being ground and wherein during a normal grinding operation thereon the surfaces would move out of their intended planes, said method comprising the steps of:
    (a) rotatably supporting the workpiece while simultaneously performing grinding operations on the opposite surfaces thereof utilizing opposed grinding discs,
    (b) supplying coolant to the grinding discs and the workpiece surfaces in the areas of said grinding operations, and
    (c) supplying additional coolant to one of the grinding discs in advance of the respective grinding operation thereof and to the surface engaged by the one grinding disc subsequent to said respective grinding operation to provide for a controlled heating of the surfaces during the grinding operation to retain the surfaces in their respective planes during and subsequent to said grinding operation.

12. The method of claim 11 wherein
    (a) said surfaces are subjected to unequal restraint against thermal expansion, and
    (b) said surfaces are similarly heated during a grinding operation thereon.

References Cited
UNITED STATES PATENTS

| | | | |
|---|---|---|---|
| 1,627,858 | 5/1927 | Morgal | 51—118 |
| 3,382,622 | 5/1968 | Dunn | 51—118X |
| 3,473,269 | 10/1969 | Sattler | 51—118 |

HAROLD D. WHITEHEAD, Primary Examiner

U.S. Cl. X.R.

51—267, 322